March 26, 1935.  J. J. COMPO  1,995,840
MUFFLER PIPE CONNECTER
Filed April 24, 1933
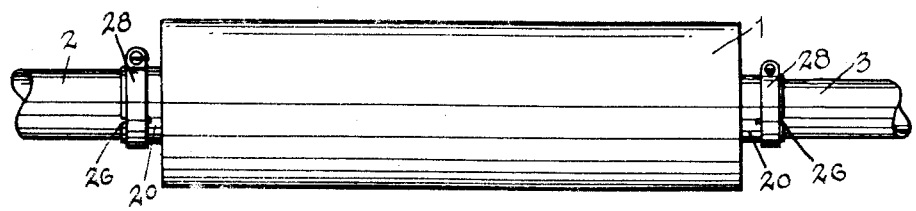
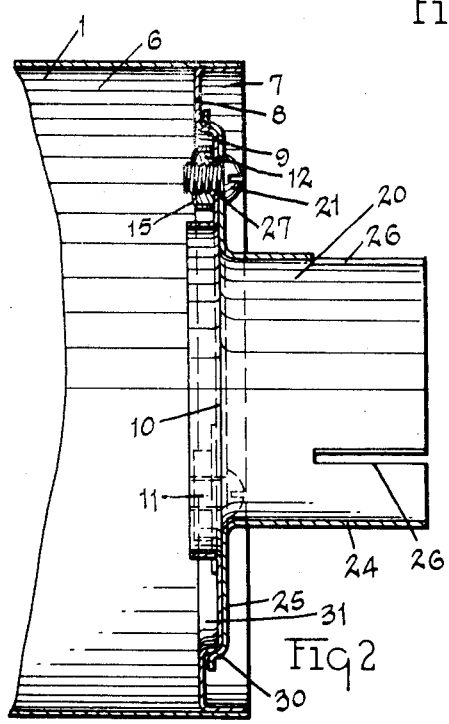
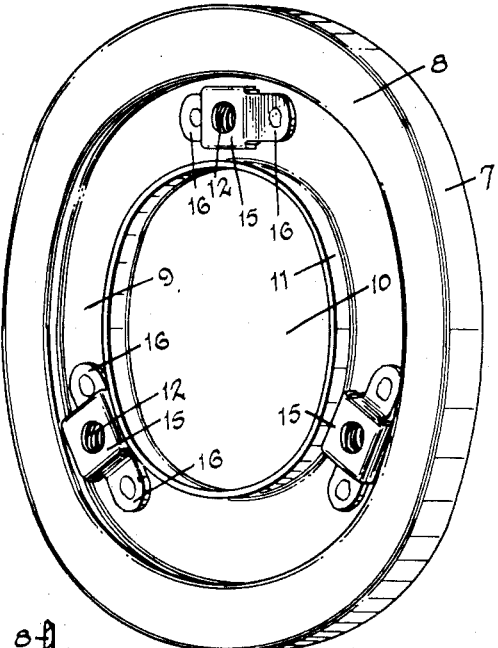
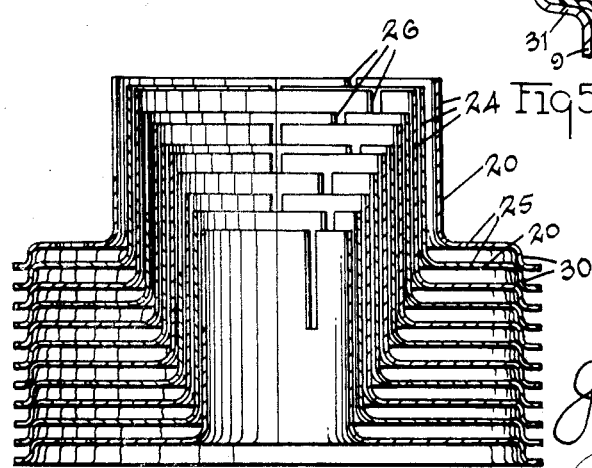
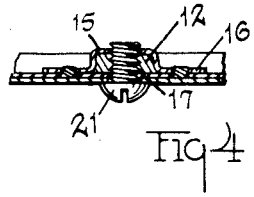
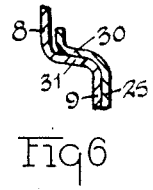
Inventor
John J. Compo
By Faust H. Crampton
Attorney Patented Mar. 26, 1935

1,995,840

UNITED STATES PATENT OFFICE 1,995,840

MUFFLER PIPE CONNECTER

John J. Compo, Defiance, Ohio

Application April 24, 1933, Serial No. 667,593

1 Claim. (Cl. 285—198)

My invention has for its object to provide muffler pipe connecters for connecting the muffler to pipes of any of the usual sizes and that may be readily nested one within the other for shipment and which are so formed that when connected to the ends of the muffler their contact areas will be sealed as against the escape of exhaust gases between the end walls of the muffler and the connecter.

As is well known, mufflers of given dimensions may be used in connection with a great variety of makes of automobiles, trucks and other engine driven conveyances that have engine exhaust pipes that vary in dimensions and use muffler discharge pipes which differ in size. The invention thus provides muffler connecters to accommodate the various dimensions of the pipes. Thus mufflers, which are somewhat complex structures, may be standardized as to exterior dimensions and interior constructions and the connecters, which are relatively simple in construction, may be used to make the pipe connections. This results in a great saving in cost of manufacture, and the selling price of the muffler.

Structures containing the invention may vary in their details and to illustrate a practical application of the invention, I have selected a connecter or pipe adapter as an example of the structures containing my invention. The structure selected as an example is shown in the accompanying drawing and is described hereinafter.

Fig. 1 is a side view of the muffler shown connected to the engine exhaust pipe and the muffler discharge pipe. Fig 2 is a view of a section of an end part of the muffler and one of the pipe connecters. Fig. 3 is a perspective view of one of the heads or end plates of the muffler. Fig. 4 is a view of a section of a nut and clip used for connecting the connecter to one of the heads of the muffler. Fig. 5 illustrates portions of the connecter and the head that coact to seal the muffler to prevent the escape of gases between the muffler and the connecter. Fig. 6 illustrates the part shown in Fig. 5 drawn into position by the nuts and screws illustrated in Figs. 2, 3, and 4. Fig. 7 illustrates a nested set of connecters illustrating the manner in which the connecters may be stacked for purposes of shipment.

In Fig. 1 is shown, conventionally, a muffler 1 connected to the exhaust pipe 2 of an internal combustion engine and provided with a muffler discharge pipe 3. The pipes 2 and 3 are ordinarily of different sizes but obviously may have the same diameters. The interior construction of the muffler may be varied to produce the desired reduction in the pulsating pressures to cause substantially constant delivery pressure, whereby the explosive engine exhausts are muffled. The invention here pertains to the connection between such a muffler and the exhaust pipe of the engine and the delivery or tail pipe of the muffler and, consequently, may be used in connection with any form of muffler.

The end plates or heads of the drum 6 of the muffler 1 are formed of sheet metal stamping and may be provided with a suitable flange 7 that fits the interior surfaces of the end edge portions on the drum 6 and welded thereto to secure the heads 8 as against the pressures created within the drum. The heads 8 are provided with raised central portions 9 and within the areas of the raised portions are formed the openings 10 that may be, for the purpose of strengthening the central portion of the drum, provided with inwardly extending flanges 11. In advance of the assembly of the heads 8 within the drum 6, nuts 12 are secured to the inner face of each of the heads 8 to form an efficient clamping member that will cooperate to secure a connecter to the head. The nut gives thickness of material that could not be obtained by striking up and threading portions of the sheet metal of which the heads are formed. This gives a pressure resisting strength sufficient to withstand the high peak pressure produced upon delivery of exhaust gases from the engine to the muffler. In order to secure the nuts 12 in position, they are located within clips 15 formed from sheet metal and shaped to enclose the nuts. The clips 15 are provided with ears 16 that may be spot welded to the interior surfaces of the heads 8 to secure the threaded portions of the nuts in alignment with the opening 17 formed in the heads 8.

The connecters 20 are selected according to the sizes of the engine exhaust pipe and the muffler discharge pipe. They are so formed that they may be readily nested one within the other. A plurality of connecters for different sizes of pipes are shown nested one within the other in Fig. 7. They may be secured to the ends of the muffler by means of screws 21 that may be threaded into the nuts 12 and thus readily placed in position for connecting with the pipes 2 and 3. Consequently, the mufflers of any type having the heads 8 may be shipped with a plurality of sets of connecters and the mufflers may be installed in automobiles of different makes having pipes 2 and 3 of dimensions that differ. Upon installing such a muffler, connecters are selected according to the diameters of the pipes.

This greatly reduces the cost of production and, consequently, the price of the muffler by reason of the fact that the muffler 1 may be used in connection with internal combustion engines of different kinds and sizes, where otherwise mufflers having flange openings of different sizes would be required in order that they may be used with internal combustion engines of different kinds and sizes.

Each connecter is provided with a cylindrical part 24 and a flange part 25. The cylindrical part 24 forms a passageway through the connecter. It protrudes centrally with respect to the flange part 25. The outer end portion of the cylindrical part 24 is slotted, as at 26, to render the end flexible for clamping the end portion around the pipes 2 or 3 by means of suitable split ring clamps 28 of the type well known for clamping pipes and connecters together. The flange part 25 is provided with suitable openings 27 through which the screws 21 may be inserted and rotated and thus threaded into the nuts 12 to clamp the face of the flange part 25 of the connecter against the face of the drum head. Preferably, the peripheral edge portion of the flange part 25 is provided with a lip 30 that fits over the corner formed in the raised central portion 9 of the head. In order to form a tight seal around the edge of the flange part 25, the interior surface of the lip 30 is formed to fit the lateral surface of the protruding portion 9 of the head 8 so that when the connecter is clamped to the head, the lip 30 will tightly fit the lateral surface of the protruding part 9. Preferably, the lateral surface 31 is inclined, that is formed conical, and the inner surface of the lip 30 is also inclined or formed conical and the interior major diameter of the lip 30 is formed slightly smaller than the interior diameter of the lateral surface 31 of the protruding portion 9 so that when the connecter is pressed against the drum, the two surfaces will wedge against each other, the parts being so formed that even with a slight pressure they will be held in their relative position which is convenient for assembly purposes and operates also to tightly seal as against the escape of gases between the inner end of the connecter and the outer face of the head of the muffler when the flange part of the connecter is tightly drawn by the screws 21 and the nuts 12 towards the face of the drum.

Thus the invention provides a means for connecting a standardized muffler with pipes of different dimensions and tightly sealing the connection that is made and wherein the connecters may be readily stacked and shipped.

I claim:

A pipe coupling for a muffler having a sheet metal end plate, the end plate having an opening, and a raised circular portion surrounding the said opening, the said raised portion having conically shaped lateral part, a sheet metal slotted cylindrically shaped part having a circular flange and removably connected to the end plate, the flange having a peripherally disposed lip sloping conically from the body of the flange, the conical lip and the conical part having substantially the same dimension, and the conical lip fitting the conical part.

JOHN J. COMPO.